US006859694B2

(12) United States Patent
Andrews et al.

(10) Patent No.: US 6,859,694 B2
(45) Date of Patent: Feb. 22, 2005

(54) SYSTEM AND METHOD FOR PROXY FILING AND CLOSING OF FLIGHT PLANS

(75) Inventors: James Neal Andrews, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 10/351,562

(22) Filed: Jan. 23, 2003

(65) Prior Publication Data

US 2004/0148065 A1 Jul. 29, 2004

(51) Int. Cl.[7] .................................................. G06F 19/00

(52) U.S. Cl. ............................. 701/25; 701/14; 701/24; 707/4; 707/104.1; 244/175; 342/36

(58) Field of Search ................................ 701/3, 14, 24, 701/25, 32, 120, 202; 707/4, 104.1; 244/175; 342/36

(56) References Cited

U.S. PATENT DOCUMENTS 4,827,419 A * 5/1989 Selby, III .................... 701/200
6,199,008 B1 * 3/2001 Aratow et al. .............. 701/120
6,317,659 B1 * 11/2001 Lindsley et al. ............... 701/1

* cited by examiner

*Primary Examiner*—Thomas G. Black
*Assistant Examiner*—Arthur D. Donnelly
(74) *Attorney, Agent, or Firm*—Duke W. Yee; Jeffrey S. LaBaw; Stephen J. Walder, Jr.

(57) ABSTRACT

The present invention provides a system and method for filing and closing of flight plans. With the present invention, a computing device is provided that includes a flight plan filing device that is capable of electronically transmitting a flight plan to an airport server. The flight plan filing device provides an electronic form, such as an electronic version of FAA Form 7233-1, which may receive input from a user, such as a pilot of an aircraft. The completed electronic form is then transmitted to an airport server which forwards the form to a regulatory agency server which assigns a transponder code to the flight plan and stores the flight plan in association with the transponder code. The airport server further monitors for transponder signals of aircraft within a predetermined distance of the airport. When the airport server receives a transponder signal, the airport server determines whether the aircraft has landed based on the altitude indicated in the transponder signal. If the aircraft has landed, the airport server attempts to close a flight plan associated with the transponder code sent in the transponder signal by sending a close flight plan message to the regulatory agency server.

31 Claims, 6 Drawing Sheets

FORM APPROVED OMB NO. 2120-0026

U.S. DEPARTMENT OF TRANSPORTATION
FEDERAL AVIATION ADMINISTRATION
FLIGHT PLAN (FAA USE ONLY) ☐ PILOT ☐ VNR ☐ STOPOVER | TIME STARTED | SPECIALIST INITIALS

1. TYPE: VFR / IFR / DVFR
2. AIRCRAFT IDENTIFICATION
3. AIRCRAFT TYPE/ SPECIAL EQUIPMENT
4. TRUE AIRSPEED KTS
5. DEPARTURE POINT
6. DEPARTURE TIME: PROPOSED (Z) / ACTUAL (Z)
7. CRUISING ALTITUDE
8. ROUTE OF FLIGHT
9. DESTINATION (Name of airport and city)
10. EST. TIME ENROUTE: HOURS / MINUTES
11. REMARKS
12. FUEL ON BOARD: HOURS / MINUTES
13. ALTERNATE AIRPORT(S)
14. PILOTS NAME, ADDRESS & TELEPHONE NUMBER & AIRCRAFT HOME BASE
15. NUMBER ABOARD
17. DESTINATION CONTACT/TELEPHONE (OPTIONAL)
16. COLOR OF AIRCRAFT CIVIL AIRCRAFT PILOTS. FAR Part 91 requires you file an IFR flight plan to operate under instrument flight rules in controlled airspace. Failure to file could result in a civil penalty not to exceed $1,000 for each violation (Section 901 of the Federal Aviation Act of 1958, as amended). Filing of a VFR flight plan is recommended as a good operating practice. See also Part 99 for requirements concerning DVFR flight plans.

FAA Form 7233-1 (8-82) CLOSE VFR FLIGHT PLAN WITH ________________ FSS ON ARRIVAL

SYSTEM AND METHOD FOR PROXY FILING AND CLOSING OF FLIGHT PLANS

BACKGROUND OF THE INVENTION

1. Technical Field

The present invention is directed to a system and method for proxy filing and closing of flight plans.

2. Description of Related Art

When a pilot is about to undertake a trip by aircraft, the pilot may file a flight plan with the Federal Aviation Administration (FAA) to inform them of the specifics of the trip that the pilot intends to make. These specifics include, for example, the aircraft identification, the type of aircraft, the expected airspeed, the departure point, the departure time, the cruising altitude, the route of the flight, the destination, the estimated time enroute, the amount of fuel on board the aircraft, the alternate airports, the pilot's name, address and telephone number, a contact at the destination, and the like. This information is filed with the FAA using FAA Form 7233-1 entitled the Flight Plan. FIGS. 1A and 1B illustrate an example FAA Form 7233-1.

Typically, the FAA Form 7233-1 is filed by hand at the departure point for the aircraft. Filing by hand involves the pilot filling out the form manually and providing the completed form to airport personnel who then call an FAA telephone number and provide the answers on the form to an FAA representative. The FAA representative then enters into the FAA computer system the flight plan information. Alternatively, the pilot may contact the FAA via the FAA telephone number directly and file the flight plan.

Once a flight plan is filed, the pilot is required to contact the FAA to "close" the flight plan within 30 minutes of the estimated arrival time. What is meant by "closing" the flight plan is that the pilot informs the FAA of his/her arrival at the destination and thereby, cancels the flight plan from the FAA computer system. If the pilot does not close the flight plan within the 30 minute time window, the FAA and airport officials begin a search to locate the aircraft and pilot. In this way, flight plans provide a mechanism by which the FAA and airports may determine if an aircraft is missing or may be in need of assistance.

Pilots often times forget or fail to close out flight plans once they arrive at the destination. This causes the FAA and airport officials to instigate unnecessary searches for aircraft and pilots. Because of this, pilots often decide not to file flight plans (which are optional and not required by the FAA) in order to avoid problems with the FAA and airports when they fail or forget to close out flight plans.

In view of the above, it would be beneficial to have a system and method for filing and closing flight plans that is more convenient and consistent than the current manual approach. It would further be beneficial to have a system and method for filing flight plans via a proxy device and for automatically closing out flight plans upon arrival of the aircraft at its destination.

SUMMARY OF THE INVENTION

The present invention provides a system and method for filing and closing of flight plans. With the present invention, a computing device is provided that includes a flight plan filing device that is capable of electronically transmitting a flight plan to an airport server. The flight plan filing device provides an electronic form, such as an electronic version of FAA Form 7233-1, which may receive input from a user, such as a pilot of an aircraft. The completed electronic form is then transmitted to an airport server which forwards the form to a regulatory agency server. The regulatory agency server stores the flight plan identified on the electronic form along with an assigned transponder code and returns a confirmation of filing of the flight plan to the airport server. The confirmation includes an identification of the transponder code assigned to the flight plan.

The airport server sends a confirmation message to the flight plan filing device indicating the transponder code. This transponder code may be displayed for viewing by the user and/or may be used to automatically set the transponder code of the transponder in the aircraft.

The airport server further monitors for transponder signals of aircraft within a predetermined distance of the airport. When the airport server receives a transponder signal, the airport server determines whether the aircraft has landed based on the altitude indicated in the transponder signal. If the aircraft has landed, the airport server attempts to close a flight plan associated with the transponder code sent in the transponder signal by sending a close flight plan message to the regulatory agency server.

The regulatory agency server receives a request to close a flight plan from the airport server and determines if there are any active flight plans associated with the transponder code. If so, the regulatory agency server then determines if the airport from which the request was received is a destination identified in the flight plan associated with the transponder code. If so, the flight plan is closed. Otherwise, the flight plan is not closed. In either case, a response message is sent to the airport server indicating whether the flight plan was closed or not and a reason as to why the flight plan could not be closed if it was not closed.

These and other features will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
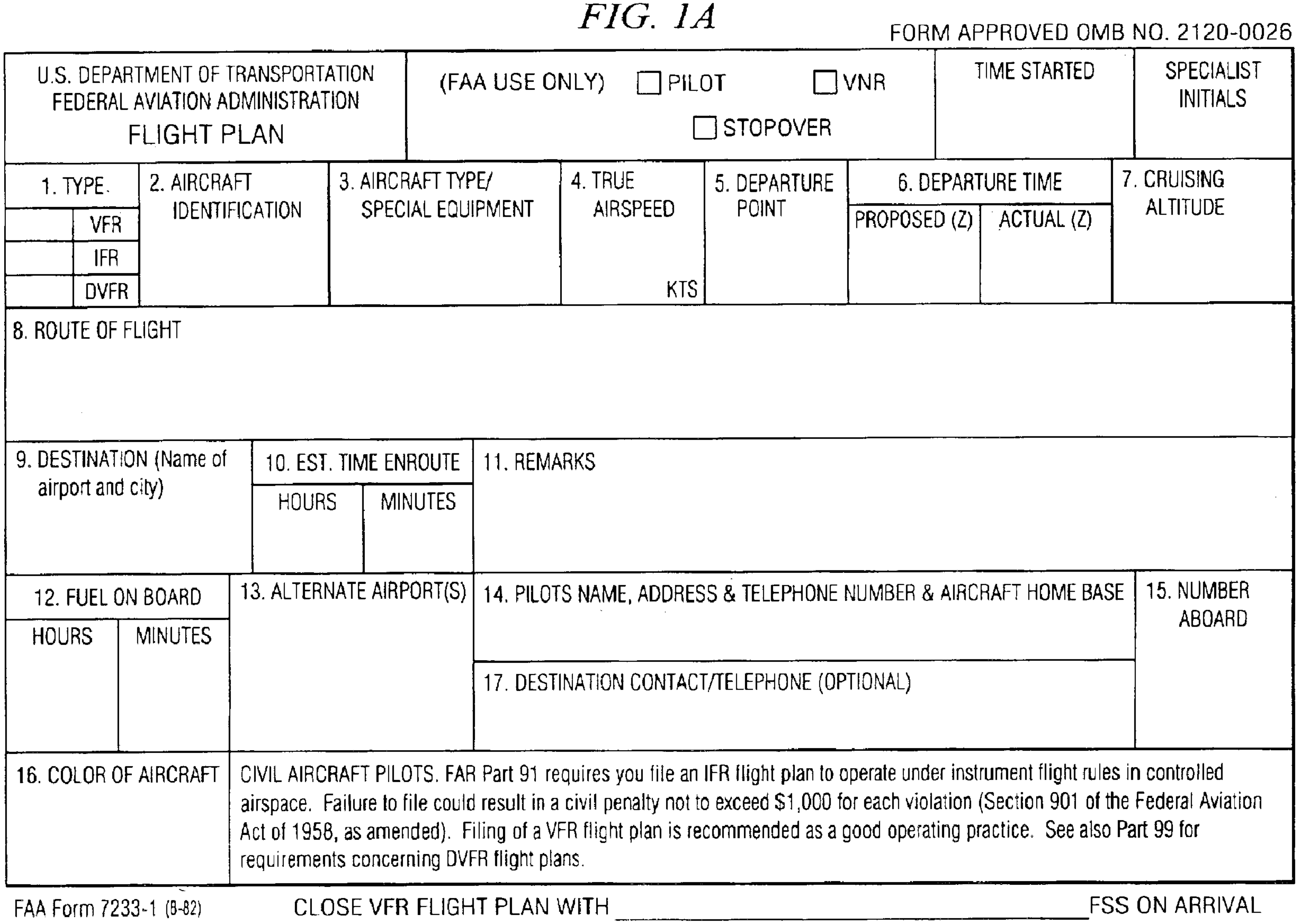
FIGS. 1A–1B is an example of FAA Form 7233-1, the Flight Plan.
Figure 1B:
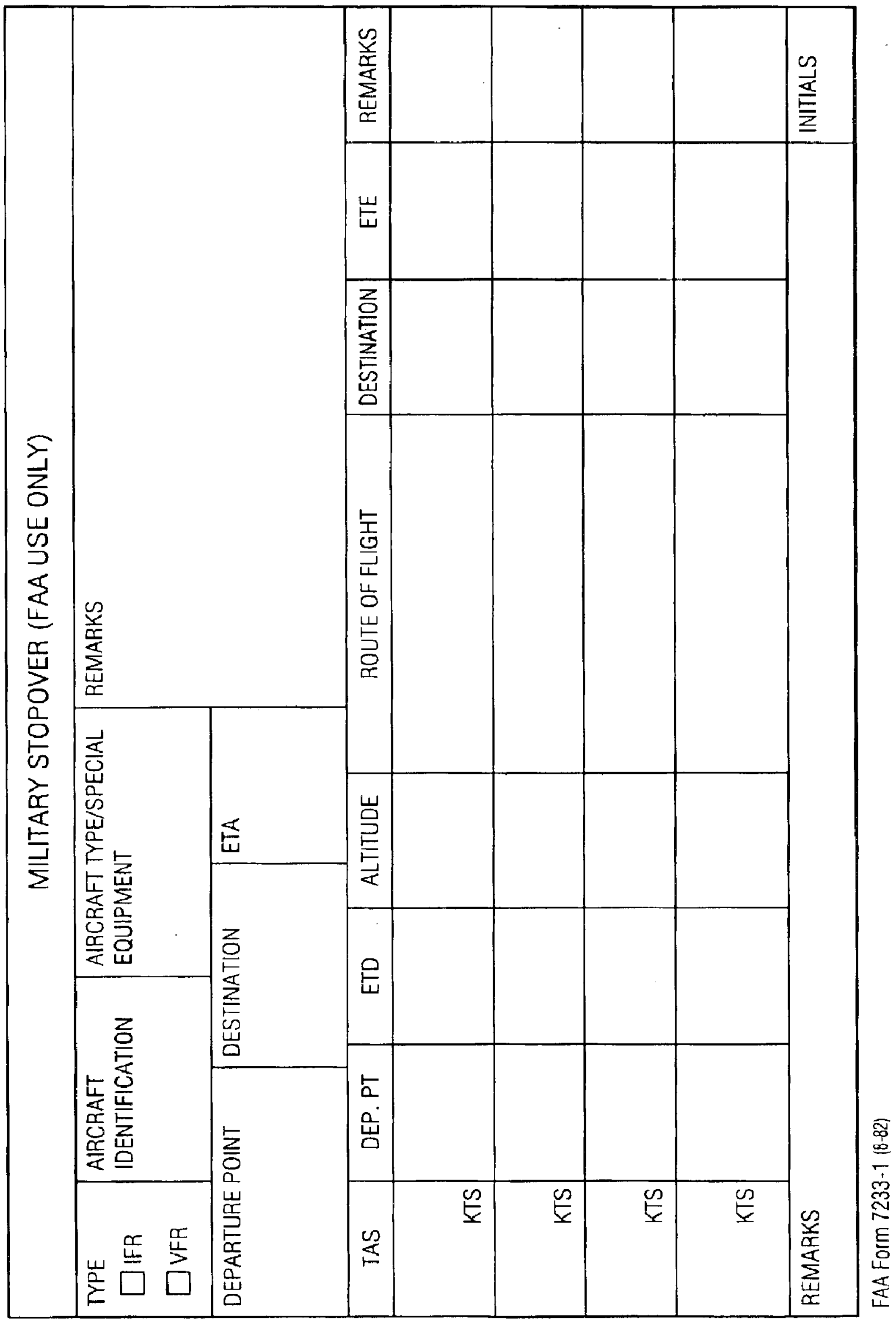
Figure 2:
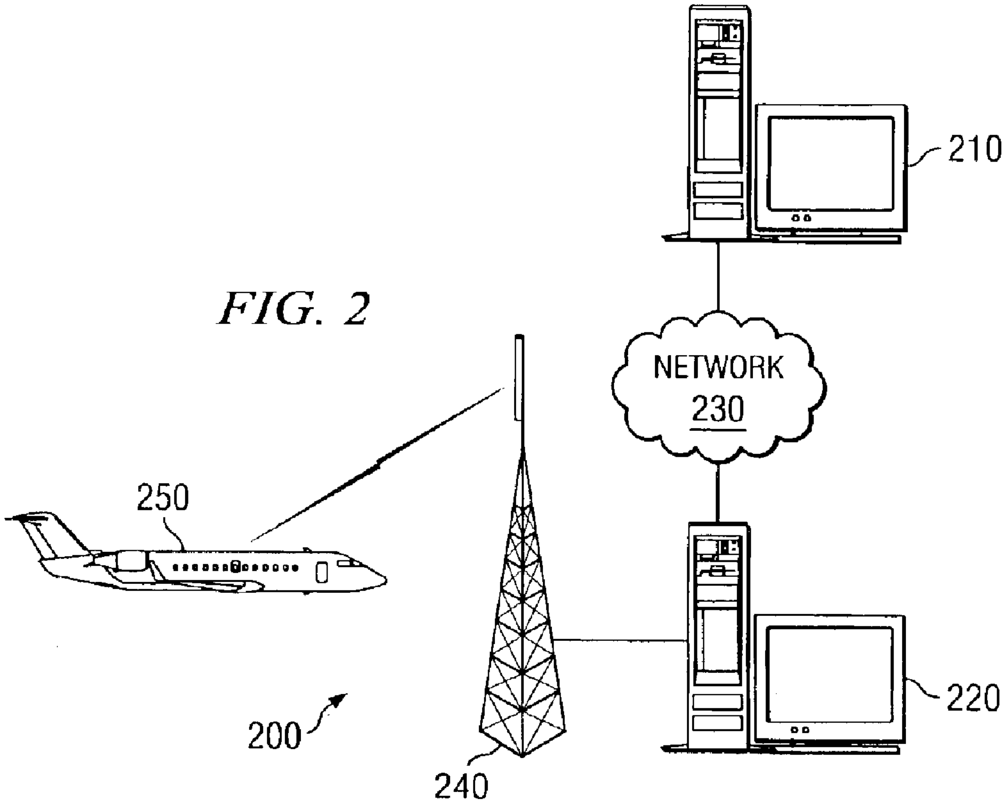
FIG. 2 is an exemplary diagram of a proxy flight plan system according to the present invention.

The present invention provides a system and method for proxy filing and closing of flight plans. FIG. 2 illustrates an exemplary system for the handling of flight plans in accordance with the present invention. As shown in FIG. 2, the system 200 is comprised of a regulatory agency computing device 210, hereafter referred to as a Federal Aviation Administration (FAA) server since the FAA is the current regulatory agency for regulating flight plans, which is in communication with one or more airport server computing devices 220 via at least one network 230.

The FAA server 210 and the airport server 220 may be server computing devices generally known in the art. The network 230 may include one or more communication networks of the same or different types. For example, the network 230 may be the Internet, an intranet, a local area network, a wide area network, a telephone network, a cellular or satellite network, or the like. Furthermore, the network 230 may be any combination of two or more of these network types.

The airport server 220 communicates with flight plan filing devices in aircraft 250 via wireless communication and transceiver 240. Such wireless communication may be performed, for example, using local network such as Bluetooth, infrared communication, cellular communication, packet radio communication, or the like. In a preferred embodiment, the wireless communication is between a flight plan filing device on board the aircraft 250 and the airport server 220, however the present invention is not limited to such. Rather, the flight plan filing device may be portable and may be elsewhere within the wireless communication network other than within the aircraft 250.

In alternative embodiments, the flight plan filing device may be a computing device coupled to the airport server 220 through a wired or wireless network, such as network 230. Such a computing device may be physically located near or far from the airport server 220. For example, the computing device may be remotely located and communicate with the airport server over the Internet, an intranet, a wide area network, a local area network, or the like. In other alternative embodiments, the computing device may be a kiosk in a terminal of the airport, or other fixed position computing device within close proximity to the airport, that is capable of performing the flight plan filing operations of the present invention.

In operation, a pilot of aircraft 250 enters a flight plan using an electronic version of the FAA Form 7233-1 provided by the flight plan filing device. The flight plan filing device then transmits the completed FAA Form 7233-1 to the airport server 220. The airport server 220 relays the FAA Form 7233-1 to the FAA server 210 via the network 230. The FAA server 210 stores the flight plan in an associated memory or storage device along with an assigned transponder code that is assigned to the aircraft associated with the flight plan.

The FAA server 210 then sends a confirmation of filing of the flight plan to the airport server 220. The confirmation preferably includes an identification of the transponder code assigned to the aircraft. The airport server 220 transmits the transponder code to the flight plan filing device. The pilot may then Bet the aircraft's transponder setting to the assigned transponder code. In an alternative embodiment, the flight plan filing device may automatically set the transponder to the appropriate transponder code.

The airport server 220 also monitors for transponder codes from arriving aircraft. As is generally known in the art, "Mode C" transponders on current aircraft typically transmit the transponder code and the altitude of the aircraft associated with the transponder code. From the altitude it can be determined whether the aircraft is airbourne or has landed at the airport. From the transponder code, an identification of the aircraft and its associated flight plan is possible using the present invention.

When the airport server 220 receives a transponder signal 220 via known mechanisms, the airport server 220 determines if the altitude indicates that the aircraft has landed. If the aircraft has landed, the airport server 220 sends a request to close a flight plan to the FAA server 210. The request includes an identification of the transponder code for the aircraft that has landed and an identification of the airport from which the request is received, e.g., DFW for Dallas-Ft. Worth International Airport.

The FAA server 210 receives the request for closing of the flight plan and searches the associated storage device or memory for a flight plan associated with the identified transponder code. If one exists, the FAA server 210 compares the identity of the requesting airport to the final destination and the alternate airports indicated in the flight plan. If there is a match, then the flight plan is closed and an acknowledgement of closing of the flight plan is sent to the airport server 220. If there is no match, then the airport is either an intermediary waypoint of the flight or is a non-intended destination. In either case, the closing of the flight plan is not completed and a response is sent to the airport server indicating that is the flight plan could not be closed.

When the airport server 220 receives a response back from the FAA server 210, the airport 220 sends an appropriate message to the flight plan filing device associated with the aircraft 250. If the flight plan was closed by the FAA server 210, then the message is one that indicates the closing of the flight plan. If the flight plan was not closed by the FAA server 210, then the message is one that indicates that the flight plan could not be closed. The messages received by the flight plan filing device may be displayed for viewing by the pilot.

It should be noted that, while instrument flight rules (IFR) flights must always file a flight plan and a discrete transponder code is assigned, it is possible, with visual flight rules (VFR) flights, that an aircraft may not be assigned a discrete transponder code in all instances. For example, an aircraft transponder may be set to "1200" which is a general code for a VFR flight that does not use "flight following," i.e. request for radar tracking of it's progress. With the present invention, however, if the airport server 210 determines that the aircraft is transmitting a general transponder code, such as 1200, the aircraft server 210 may transmit a request to the flight plan filing device for the registration number of the aircraft. This registration number may then be provided to the FAA server in a request to close a flight plan.

Thus, the present invention provides an automated mechanism for filing and closing of flight plans that is more convenient and consistent than current manual methods. The present invention promotes the filing of flight plans by eliminating the negative aspects of the current manual process. As a result, more flight plans are filed using the present invention and the original intent of the flight plan to provide a mechanism for identifying missing or overdue aircraft is restored.

Figure 3:
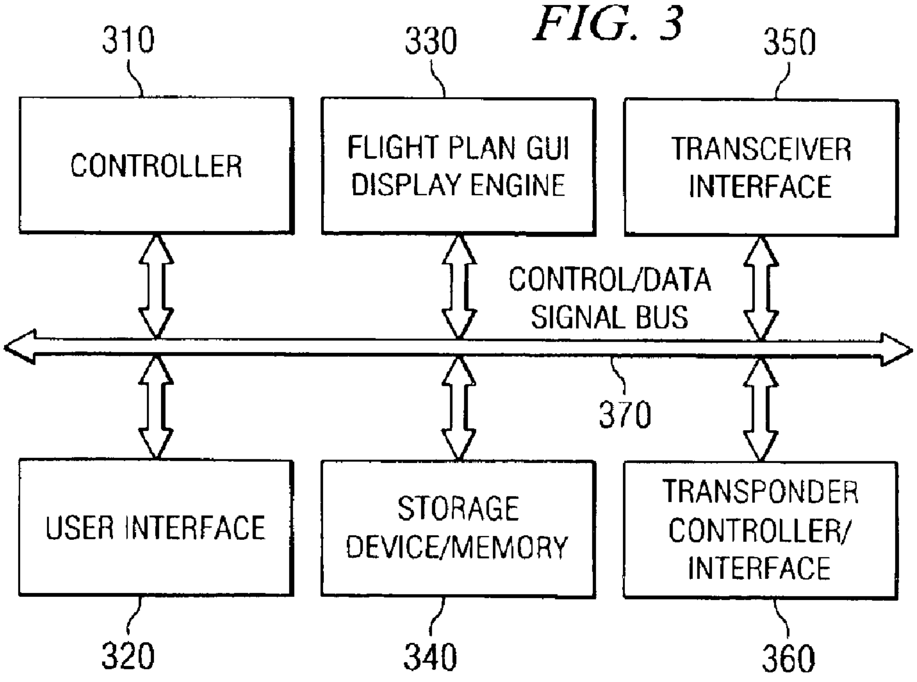
FIG. 3 is an exemplary block diagram of a flight plan filing device according to the present invention.

FIG. 3 is an exemplary embodiment of a flight plan filing device in accordance with the present invention. As shown in FIG. 3, the flight plan filing device includes a controller 310, a user interface 320, a flight plan graphical user display engine 330, a memory/storage device 340, a transceiver interface 350, and a transponder controller/interface 360. The elements 310–360 are in communication with one another via the control/data signal bus 370. Although a bus architecture is shown in FIG. 3, the present invention is not limited to such and any architecture that facilitates the communication of control/data signals between the elements 310–360 may be used without departing from the spirit and scope of the present invention.

The controller 310 controls the overall operation of the flight plan filing device and orchestrates the operation of the other elements 320–360. The user interface 320 provides a mechanism through which a graphical user display may be output for viewing by a user and input from the user may be received. Such input may be received, for example, via a touch screen, keyboard, pointing device, computer tablet, touch pad, or the like.

The flight plan graphical user interface display engine 330 generates a graphical user interface through which user input may be received for filing a flight plan. In an exemplary embodiment, the graphical user interface includes an electronic version of FAA Form 7233-1 with fields for receiving user input to the electronic version of the form. The completed form is stored in the memory/storage device 340 for transmission to an airport server via the transceiver interface 350.

Upon filing of the flight plan, a response is received from the airport server via the transceiver interface 350. The response acknowledges the filing of the flight plan and indicates the transponder code assigned to the aircraft. A message may then be displayed via the user interface 320 indicating filing of the flight plan and the transponder code to which the pilot should set the aircraft's transponder. In a preferred embodiment, the transponder code identified in the received response is used to automatically set the aircraft's transponder to the appropriate code using the transponder controller/interface 360.

In addition, messages regarding the closing or inability to close a flight plan may be displayed to the user via the user interface 320. Such messages are displayed in response to receipt of messages from the airport server indicating either the closing or inability to close a flight plan upon arrival of the aircraft at an airport.

The flight plan filing device of FIG. 3 may be implemented in any computing device. For example, the flight plan filing device may be integrated into a computer system on board the aircraft, in a laptop or portable computer, in a personal digital assistant, or other type of portable or non-portable computing device.

Figure 4:
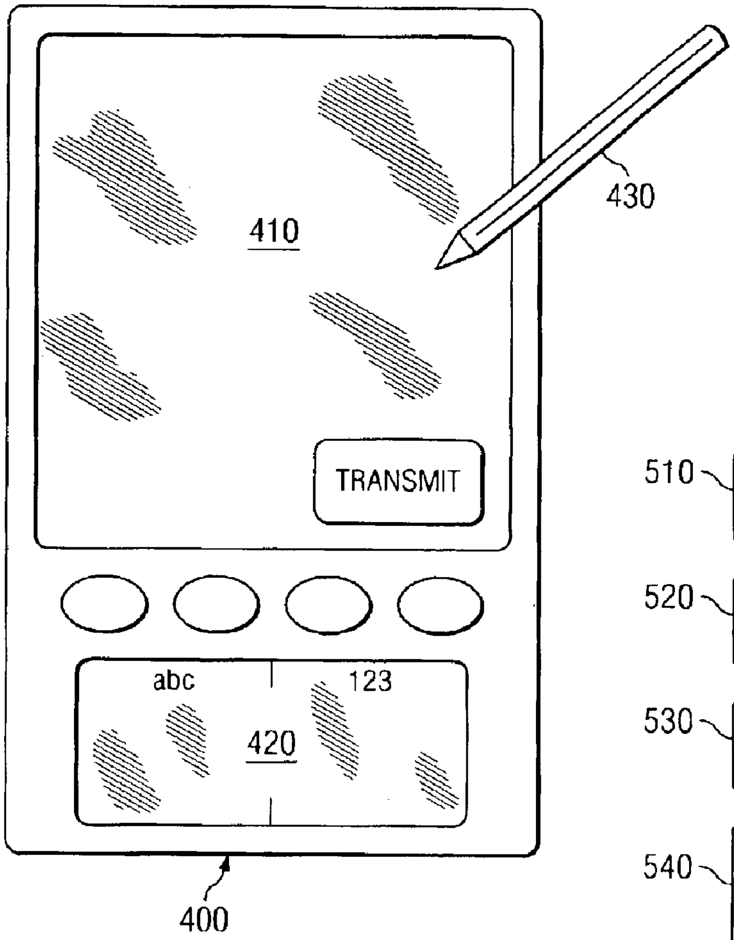
FIG. 4 is an exemplary diagram of a computing device which may implement the flight plan filing device of FIG. 3.

FIG. 4 is an exemplary diagram of a personal digital assistant in which the flight plan filing device may be implemented. As shown in FIG. 4, the personal digital assistant includes a touch sensitive display portion 410 in which an electronic version of FAA Form 7233-1 and various messages may be displayed. The personal digital assistant further includes an input portion 420 through which alphanumerical input may be received using the stylus 430. The touch sensitive display portion 410 may be used to select fields in a displayed form in which subsequent input to input portion 420 is inserted.

Preferrably, the portable digital assistant includes either a physical button, or virtual button in the display portion 410, which may be selected in order to transmit the completed FAA Form 7233-1 to an airport server for filing with the FAA server. The personal digital assistant may include a physical communication interface for coupling to a transceiver that performs the transmission of the form to the airport server. Alternatively, the personal digital assistant may have an integrated wireless transceiver for transmitting flight plans and receiving response messages.

Figure 5:
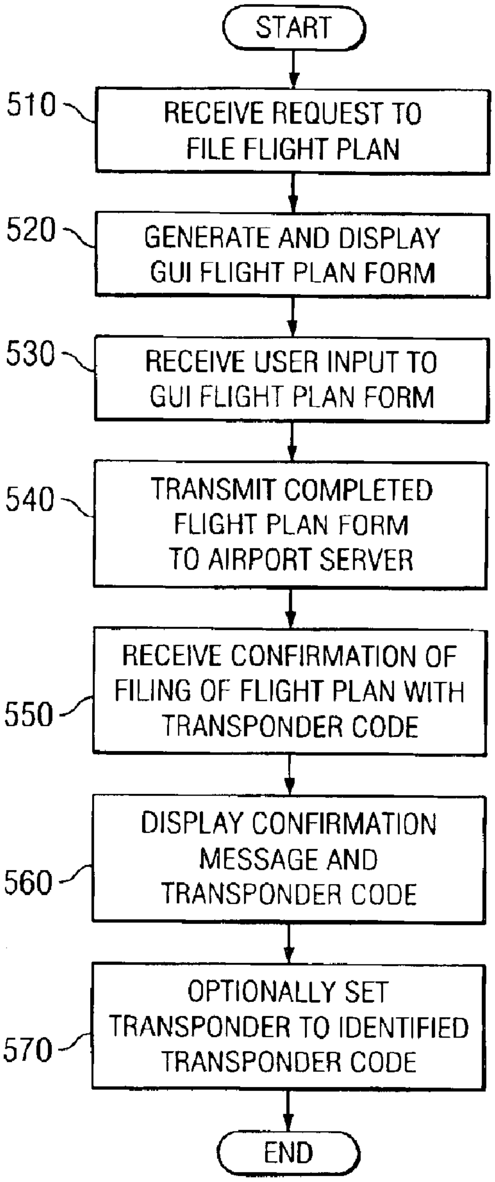
FIG. 5 is a flowchart outlining an exemplary operation of a flight plan filing device according to the present invention.

FIG. 5 is a flowchart outlining an exemplary operation of a flight plan filing device in accordance with the present invention. As shown in FIG. 5, the operation starts with receiving a request to file a flight plan from a user (step 510). This may be, for example, the initiation of a flight plan filing application on the computing device, for example.

The flight plan filing device generates a graphical user interface display of a form for entry of flight plan information (step 520). The flight plan filing device then receives input from the user via the graphical user display and a user interface (step 530). Upon selection of a transmission button (either physical or virtual), the flight plan filing device transmits the completed flight plan form to an airport server (step 540). As previously mentioned, this transmission is preferably through wireless means and preferably through a local wireless network such as a Bluetooth, infrared, packet radio, or similar local wireless network.

Thereafter, the flight plan filing device receives a confirmation of filing of the flight plan with the FAA server along with an assigned transponder code (step 550). A confirmation message and the assigned transponder code may then be displayed using the computing device for viewing by a user (step 560). Optionally, the flight plan filing device may be equipped with a transponder controller/interface that automatically sets the transponder code of the transponder on board the aircraft to the assigned transponder code (step 570). The operation then ends.

Figure 6:
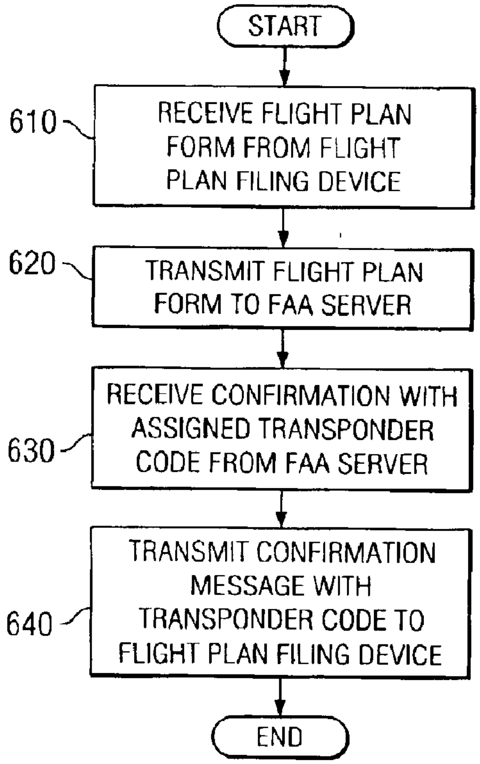
FIG. 6 is a flowchart outlining an exemplary operation of an airport server when filing a flight plan with an FAA server in accordance with the present invention.

FIG. 6 is a flowchart outlining an exemplary operation of an airport server when filing a flight plan in accordance with the present invention. As shown in FIG. 6, the airport server receives the flight plan via a wireless communication from a flight plan filing device associated with an aircraft (step 610). The airport server then transmits the flight plan to a regulatory agency server, e.g., an FAA server (step 620). The airport server then receives a confirmation message indicating that the flight plan has been filed with the FAA server and an assigned transponder code (step 630). The airport server then sends a confirmation message to the flight plan filing device that sent the flight plan (step 640). This confirmation message includes an indication of the transponder code assigned to the aircraft by the FAA server.

Figure 7:
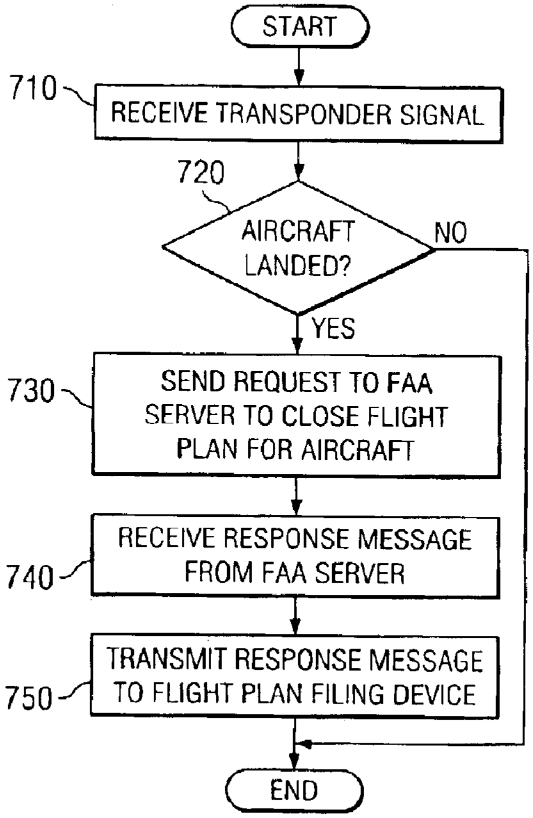
FIG. 7 is a flowchart outlining an exemplary operation of an airport server when closing a flight plan in accordance with the present invention.

FIG. 7 is a flowchart outlining an exemplary operation of an airport server when closing a flight plan in accordance with the present invention. As shown in FIG. 7, the operation starts with receiving a transponder signal from an aircraft transponder (step 710). The transponder signal includes the transponder code current set for the aircraft along with an altitude of the aircraft. The altitude indicated in the transponder signal is compared to the elevation of the airport to determine if the aircraft has landed (step 720). If not, the operation ends. If the aircraft has landed, a close flight plan request message is sent to the FAA server indicating the transponder code received from the aircraft and an identification of the airport (step 730).

At some time later, the airport server receives a response message from the FAA server (step 740). This response message may indicate that the flight plan was closed or that the flight plan could not be closed. If the flight plan could not be closed, the response message may further indicate the reason why the flight plan could not be closed, e.g., the airport is an intermediate waypoint, the airport is not indicated as being the destination or an alternate destination, or the like. Based on the response message, the airport server transmits a message to the flight plan filing device associated with the aircraft indicating whether the flight plan has been closed or that the flight plan could not be closed along with a reason why the flight plan could not be closed (step 750).

Figure 8:
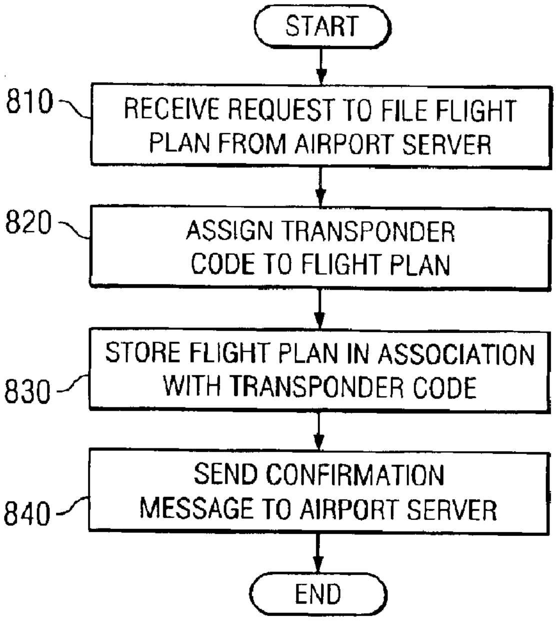
FIG. 8 is a flowchart outlining an exemplary operation of a FAA server when filing a flight plan in accordance with the present invention.

FIG. 8 is a flowchart outlining an exemplary operation of a regulatory agency server, e.g., FAA server, when filing a flight plan according to the present invention. As shown in FIG. 8, the operation starts with receiving a request to file a flight plan from an airport server (step 810). A transponder code is assigned to the flight plan (step 820) and the received flight plan is stored in a storage device or memory in association with the assigned transponder code (step 830). A confirmation message is then transmitted to the airport server that sent the request to file the flight plan (step 840). The confirmation message includes an identification of the assigned transponder code.

Figure 9:
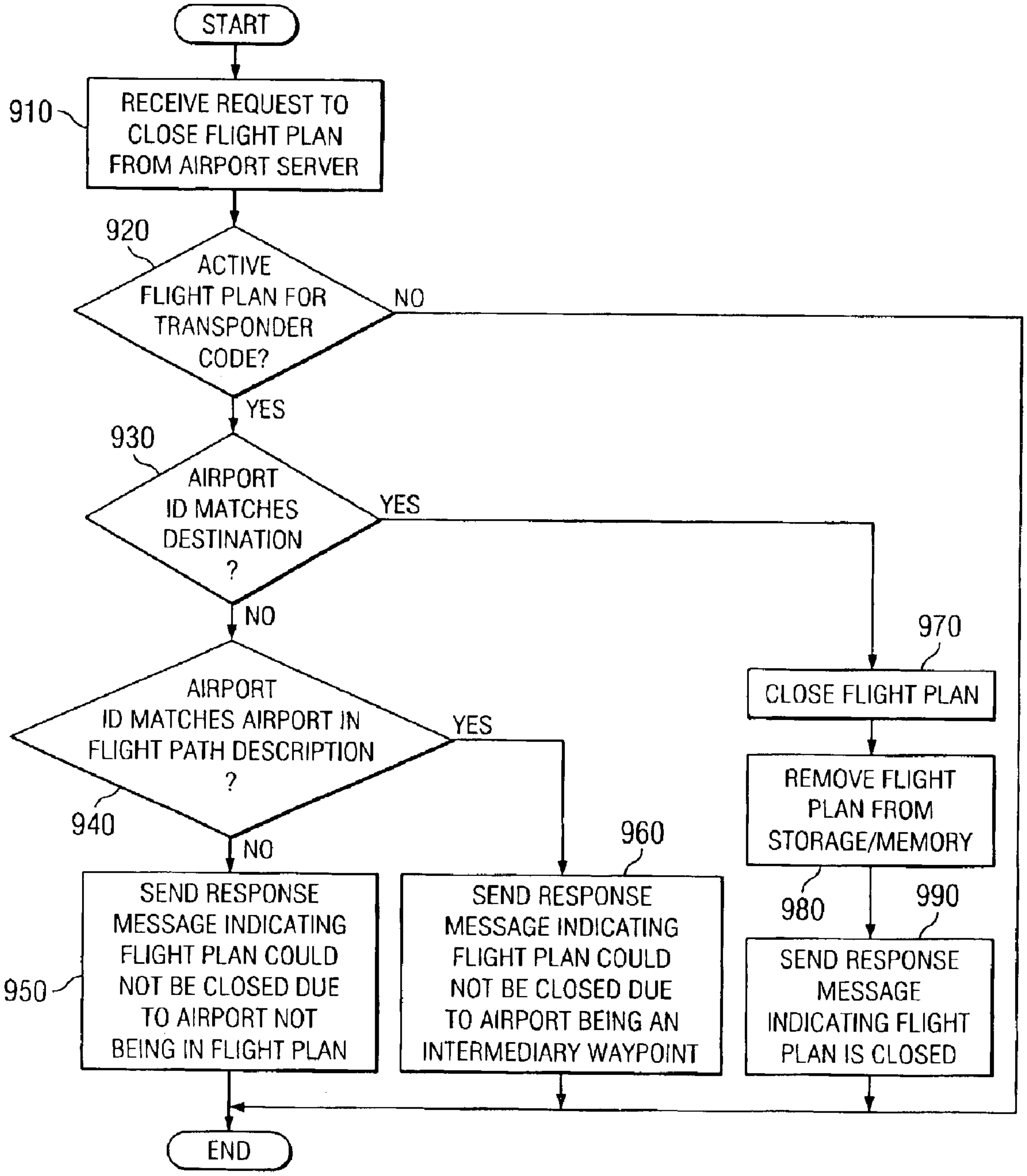
FIG. 9 is a flowchart outlining an exemplary operation of a FAA server when closing a flight plan in accordance with the present invention.

FIG. 9 is a flowchart outlining an exemplary operation of a regulatory agency server, e.g., FAA server, when closing a flight plan according to the present invention. As shown in FIG. 9, the operation starts with receipt of a request to close a flight plan from an airport server (step 910). The request includes an identification of the transponder code for the aircraft and an identification of the airport. The server compares the transponder code identified in the request to the stored flight plans to determine if there is an active flight plan associated with the transponder code (step 920). If not, the operation goes to step 9 and returns a response message indicating that there is no active flight plan for the identified transponder code.

If there is an active flight plan for the identified transponder code, the server then compares the airport identification from the request to the airport identifications included in the flight plan for the destination and alternate destinations (step 930). If there is not a match, then the server compares the airport identification from the request to airport identifications in the flight path description (step 940). If there is still not a match, then the airport is not part of the filed flight plan and a response message indicating that the flight plan could not be closed along with an reason indicating that the airport is not listed in the flight plan is sent to the airport server (step 950). If there is a match, then a response message indicating that the flight plan could not be closed along with a reason indicating that the airport is an intermediate waypoint is sent to the airport server (step 960).

If there is a match of the airport identification from the request to airport identifications in either the destination or alternate destinations of the flight plan, then the flight plan is closed (step 970) and removed from the storage or memory (step 980). A response message is then sent to the airport server indicating that the flight plan has been closed (step 990).

Thus, with the present invention, an automated system for filing and closing flight plans is provided. The system according to the present invention provides a more convenient and consistent method of filing and closing flight plans that promotes the filing of such flight plans. With increased use of flight plans, the original intent of the flight plan being a means for tracking aircraft to identify missing or overdue aircraft is promoted. In addition, the unnecessary search for aircraft and pilots that forget or fail to close flight plans is reduced through the use of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for handling flight plans, comprising:

receiving an electronic flight plan from a first computing device associated with an aircraft;

transmitting the electronic flight plan to a second computing device associated with a regulatory agency responsible for tracking flight plans; and receiving a first confirmation of filing of the electronic flight plan from the second computing device associated with the regulatory agency.

2. The method of claim 1, further comprising:

transmitting a second confirmation of filing of the electronic flight plan to the first computing device associated with the aircraft.

3. The method of claim 2, wherein the first confirmation and the second confirmation include an identification of a transponder code assigned to the electronic flight plan.

4. The method of claim 1, wherein the electronic flight plan is an electronic form having input to fields of the form provided by a user.

5. The method of claim 1, wherein the electronic flight plan is received from the first computing device associated with the aircraft via a local wireless network.

6. The method of claim 5, wherein the local wireless network includes at least one of a Bluetooth network, an infrared communication network, a packet radio communication network, and a cellular communication network.

7. The method of claim 1, wherein the electronic flight plan is an electronic version of FAA Form 7233-1.

8. The method of claim 1, wherein the electronic flight plan is received by the second computing device associated with the regulatory agency, the second computing device assigns the transponder code to the electronic flight plan, and stores the electronic flight plan in association with the assigned transponder code.

9. The method of claim 3, wherein the first computing device automatically sets a transponder of the aircraft to the transponder code.

10. The method of claim 1, further comprising:

receiving a transponder signal from an aircraft transponder;

determining if the aircraft has landed based on the transponder signal; and sending a request to close a flight plan associated with the aircraft to the second computing device if the aircraft is determined to have landed.

11. The method of claim 10, further comprising:

receiving a response from the second computing device indicating whether the flight plan has been closed or not.

12. The method of claim 11, wherein if the response includes an indication that the flight plan has not been closed, the response further includes a reason why the flight plan could not be closed.

13. The method of claim 11, further comprising:

transmitting a message to the first computing device based on the response received from the second computing device.

14. A system for handling flight plans, comprising:

a first computing device associated with an aircraft; and a second computing device associated with an airport coupled to the first computing device via a local wireless communication network, wherein the second computing device receives an electronic flight plan from the first computing device and transmits the electronic flight plan to a third computing device associated with a regulatory agency, and wherein the second computing device receives a first confirmation of filing of the electronic flight plan from the third computing device associated with the regulatory agency.

15. The system of claim 14, wherein the second computing device transmits a second confirmation of filing of the electronic flight plan to the first computing device associated with the aircraft.

16. The system of claim 15, wherein the first confirmation and the second confirmation include an identification of a transponder code assigned to the electronic flight plan.

17. The system of claim 14, wherein the electronic flight plan is an electronic form having input to fields of the form provided by a user.

18. The system of claim 14, wherein the local wireless network includes at least one of a Bluetooth network, an infrared communication network, a packet radio communication network, and a cellular communication network.

19. The system of claim 16, wherein the first computing device automatically sets a transponder of the aircraft to the transponder code.

20. The system of claim 14, wherein the second computing device receives a transponder signal from an aircraft transponder, determines if the aircraft has landed based on the transponder signal, and sends a request to close a flight plan associated with the aircraft to the third computing device if the aircraft is determined to have landed.

21. The system of claim 20, wherein the second computing device receives a response from the third computing device indicating whether the flight plan has been closed or not, and wherein the second computing device transmits a message to the first computing device based on the response received from the second computing device.

22. The system of claim 21, wherein if the response includes an indication that the flight plan has not been closed, the response further includes a reason why the flight plan could not be closed.

23. A computer program product in a computer readable medium for handling flight plans, comprising:

first instructions for receiving an electronic flight plan from a first computing device associated with an aircraft;

second instructions for transmitting the electronic flight plan to a second computing device associated with a regulatory agency responsible for tracking flight plans; and third instructions for receiving a first confirmation of filing of the electronic flight plan from the second computing device associated with the regulatory agency.

24. A computer program product in a computer readable medium for filing a flight plan, comprising:

first instructions for generating an electronic flight plan form;

second instructions for receiving input to the electronic flight plan form to thereby generate a completed electronic flight plan form; and third instructions for transmitting the completed electronic flight plan form to an airport server.

25. A method, in a data processing system, for filing a flight plan, comprising:

generating an electronic flight plan form;

receiving input to the electronic flight plan form to thereby generate a completed flight plan form; and transmitting the completed electronic flight plan form to an airport server.

26. The method of claim 25, wherein the method is implemented in one of an on board computer of an aircraft, a portable computing device, a laptop computer, and a personal digital assistant.

27. A method, in a data processing system, of closing a flight plan, comprising:

receiving a transponder signal from a transponder of an aircraft;

determining if the aircraft has landed based on the transponder signal; and sending a request to a regulatory agency computing device to close a flight plan if the aircraft is determined to have landed.

28. A method, in a data processing system, of closing a flight plan, comprising:

receiving a request to close a flight plan, the request including an identification of a transponder code associated with the flight plan and an identification of an airport at which the aircraft is present;

comparing the transponder code to stored flight plan information;

determining if a flight plan associated with the transponder code exits in the stored flight plan information; and attempting to close the flight plan associated with the transponder code if it exists in the stored flight plan information.

29. The method of claim 28, wherein attempting to close the flight plan includes:

determining if the identification of the airport corresponds to a destination identified in the flight plan; and closing the flight plan if the identification of the airport corresponds to a destination identified in the flight plan.

30. The method of claim 29, wherein if the identification of the airport does not correspond to a destination identified in the flight plan, the flight plan is not closed.

31. The method of claim 28, further comprising:

transmitting a response message to a source of the request to close the flight plan, wherein the response message indicates whether or not the flight plan has been closed and reasons as to why the flight plan could not be closed if the flight plan was not closed.

* * * * *